United States Patent [19]
O'Dougherty et al.

[11] Patent Number: 5,607,080
[45] Date of Patent: Mar. 4, 1997

[54] CHEMICAL MEASURING SYSTEM

[75] Inventors: Michael D. O'Dougherty, Maplewood; Steven W. Claussen; Robert L. Claussen, both of Benson, all of Minn.

[73] Assignee: C.A.P. Inc., Benson, Minn.

[21] Appl. No.: 389,961

[22] Filed: Dec. 30, 1994

[51] Int. Cl.⁶ ........................................................ B67D 5/08
[52] U.S. Cl. .............................. 222/67; 222/158; 222/462
[58] Field of Search ................................. 222/63, 67, 152, 222/158, 400.8, 185.1, 462; 141/18, 59, 65, 66

[56] References Cited

U.S. PATENT DOCUMENTS

| | | | |
|---|---|---|---|
| 1,419,880 | 6/1922 | Mauclere | 141/18 |
| 1,686,077 | 10/1928 | Evans | 222/462 X |
| 3,071,297 | 1/1963 | Lee | 222/462 |
| 3,455,346 | 7/1969 | Stork | 141/42 |
| 4,148,610 | 4/1979 | Miller et al. | 23/230 |
| 4,405,061 | 9/1983 | Bergandy | 222/67 X |
| 4,945,955 | 8/1990 | Murphy | 141/65 |
| 5,199,472 | 4/1993 | Rollison | 141/65 |

OTHER PUBLICATIONS literature describing a "spray tank agitator" that was modified to make the structure illustrated in Figure 4 and described in the specification in the paragraph beginning at line 3 of page 7.

Primary Examiner—Gregory L. Huson
Attorney, Agent, or Firm—William L. Huebsch

[57] ABSTRACT

A liquid chemical measuring system including an elongate translucent or transparent polymeric tank having an upper portion with graduations indicating the amount of liquid required to fill the tank to each of the graduations when said tank is vertically disposed, and a generally funnel shaped portion adjacent its lower end. The tank has a liquid passage opening through its lower end, and an air passage through a transverse wall at its upper end. A frame supports the tank with its upper end uppermost, a liquid valve is attached to the tank across its liquid passage opening, and an air pump is coupled to the air passage opening of the tank by a valve operated by a single lever so that it can alternatively cause vacuum or pressure in the tank, thereby allowing liquid to be drawn into the tank to measure it using the graduations and then to be forced out of the tank.

11 Claims, 2 Drawing Sheets

CHEMICAL MEASURING SYSTEM

TECHNICAL FIELD

The present invention relates to measuring systems for liquid chemicals, and particularly to such systems adapted to measure potentially dangerous liquid chemicals of the types applied to the earth or plants by those involved in agriculture, often while transferring desired volumes of those liquid chemicals from supplies of the chemicals to containers.

DISCLOSURE OF INVENTION

The present invention provides a simple convenient and effective reusable portable measuring system for liquid chemicals, particularly including potentially dangerous liquid chemicals of the types applied to the earth or plants by those involved in agriculture, which measuring system can be used while transferring desired volumes of those liquid chemicals from supplies of the chemicals to containers and will provide an accurate measurement of those chemicals while restricting contact between the user of the measuring system and the liquid chemical being measured.

The liquid chemical measuring system according to the present invention comprises wall means defining a tank having (1) an upper portion with graduations indicating the amount of liquid required to fill the tank to each of the graduations when the tank is vertically disposed, the wall means being of polymeric material and sufficiently light transmissive to afford visual observation of the level of the liquid in the upper portion of the tank; and (2) a generally funnel shaped portion adjacent its lower end decreasing in area from its upper portion to its lower end. The tank has a liquid passage opening through its lower end, a transverse wall at its upper end, and an air passage opening adjacent its upper end. Means are provided for supporting the tank with its axis vertical and its upper end uppermost. Liquid valve means, attached to the tank across its liquid passage opening, are adapted for opening or closing its liquid passage opening; and tank air pressure control means are coupled to the air passage opening of the tank. The air pressure control means comprises air pump means for causing a vacuum in an air inlet line to the pump means, and for causing air pressure above atmospheric pressure in an air outlet line; and air valve means manually operable by a single handle are provided for alternately 1) connecting the air inlet line to the air passage opening of the tank to cause a partial vacuum in the tank to afford drawing liquid into the tank through the liquid passage when it is open, 2) connecting the air outlet line to the air passage opening of the tank to cause a pressure above atmospheric pressure in the tank that will cause movement of liquid out of the tank through the liquid passage when it is open, and 3) blocking the air passage opening of the tank from the air inlet line and from the air outlet line. Thus, by using the air pressure control means and the liquid valve means, a user can draw a desired amount of the liquid into the tank by causing a partial vacuum in the tank while the tank is attached to a source of the liquid through the liquid valve means and the liquid passage is open, which desired amount of liquid may be determined by bringing the liquid level into visual alignment with the appropriate graduation on the tank and may require expelling liquid through the use of pressure in the tank if the tank is first overfilled through the use of vacuum. The user can then close the liquid passage by use of the liquid valve means and connect the tank to atmospheric pressure as may be desirable to transport the tank (e.g., by truck) to a different location; whereupon, the user can again use the air pressure control means to cause pressure in the tank to expel the measured amount of liquid through the liquid passage (after it is opened by the liquid valve means) into a desired receptacle, such as the tank of a spraying assembly.

In one useful configuration of the liquid chemical measuring system the upper portion of the tank is in the shape of an elongate cylinder, and the means for supporting the tank with its axis vertical and its upper end uppermost is a frame comprising an annular portion adapted to be supported on a horizontal surface and having a radius significantly bigger than the radius of the upper portion, a first collar around the funnel shaped portion having an inner radius smaller than the radius of the upper portion and adapted to support the weight of the tank, first support members between the first collar and the annular portion coaxially positioning the tank and the annular portion with the liquid valve means spaced above the horizontal surface on which the annular portion is supported; a second collar around the upper portion, and second support members between the second collar and the annular portion. This configuration both can be stable while being transported (e.g., in a truck) and can be easily and accurately filled with a desired amount of liquid.

Where more than one tank is used, means for supporting the tanks with their axes vertical and their liquid valve means spaced above a surface on which they are supported can be provided by a frame or rack adapted to receive the tanks side by side.

BRIEF DESCRIPTION OF DRAWINGS

The present invention will be further described with reference to the accompanying drawing wherein like reference numerals refer to like parts in the several views, and wherein.

DETAILED DESCRIPTION

Figure 1:
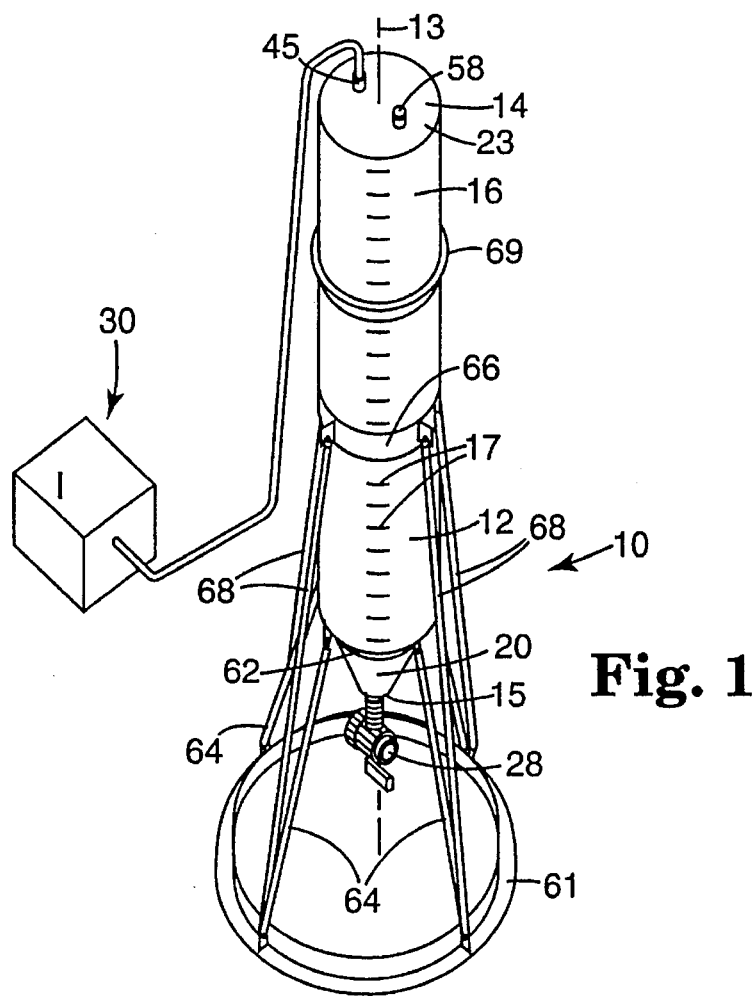
FIG. 1 is a perspective view of a liquid chemical measuring system according to the present invention.

Referring now to the drawing, there is shown in FIG. 1 a chemical measuring system according to the present invention, generally designated by the reference numeral 10.

Figure 3:
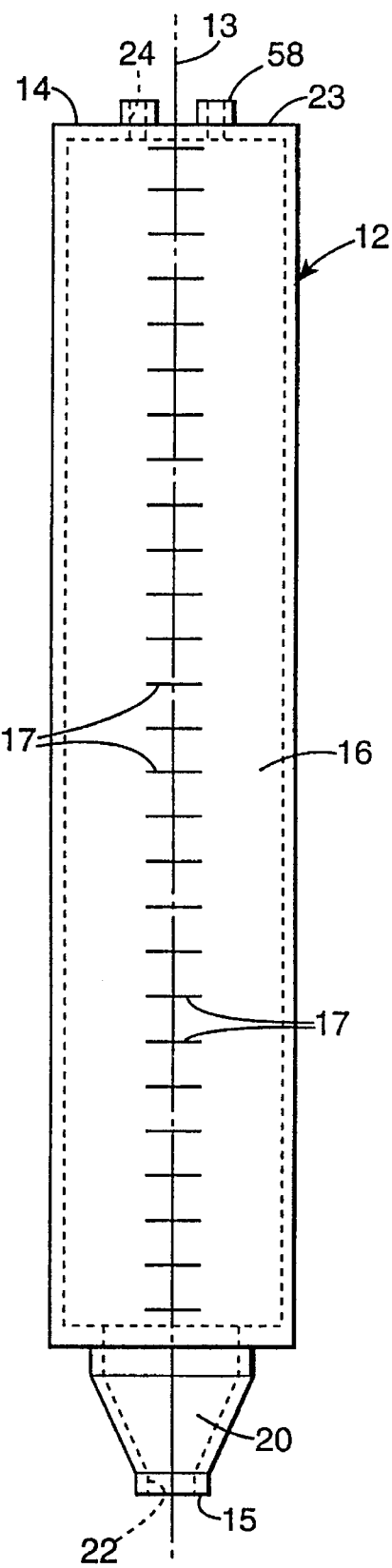
FIG. 3 is an enlarged front view of a novel tank included in the liquid chemical measuring system illustrated in FIG. 1.

Generally, the chemical measuring system 10 comprises wall means or walls defining a tank 12 (see FIGS. 1 and 3) having a central axis 13, and upper and lower axially spaced ends 14 and 15. The tank 12 includes an elongate cylindrical upper portion 16 adjacent its upper end 14 having spaced axially spaced graduations 17 indicating the amount of liquid required to fill the tank to each of the graduations 17 when the tank is disposed with its axis 13 vertical and its upper end 14 uppermost. The walls are of polymeric material and are sufficiently light transmissive to afford visual observation of the level of the liquid in the upper portion 16 of the tank 12. The tank also includes a generally funnel shaped lower portion 20 adjacent its lower end 15. The entire lower portion 20 is circular in cross section, and the lower portion 20 decreases in cross sectional area from the upper portion 16 to the lower end 15. The tank 12 has a liquid passage opening 22 through the wall at its lower end 15, a transverse wall 23 at its upper end 14, and an air passage opening 24 through the transverse wall 23 adjacent its upper end 14. Means 26 are provided for supporting the tank 12 with its axis 13 vertical and its upper end 14 uppermost. Liquid valve means 28 (e.g., a three way ball valve 28 as illustrated in FIG. 1) attached to the tank 12 across the liquid passage opening 22 is adapted for opening or closing the liquid passage opening 22; and tank air pressure control means 30 are coupled to the air passage opening 24 of the tank 12.

Figure 2:
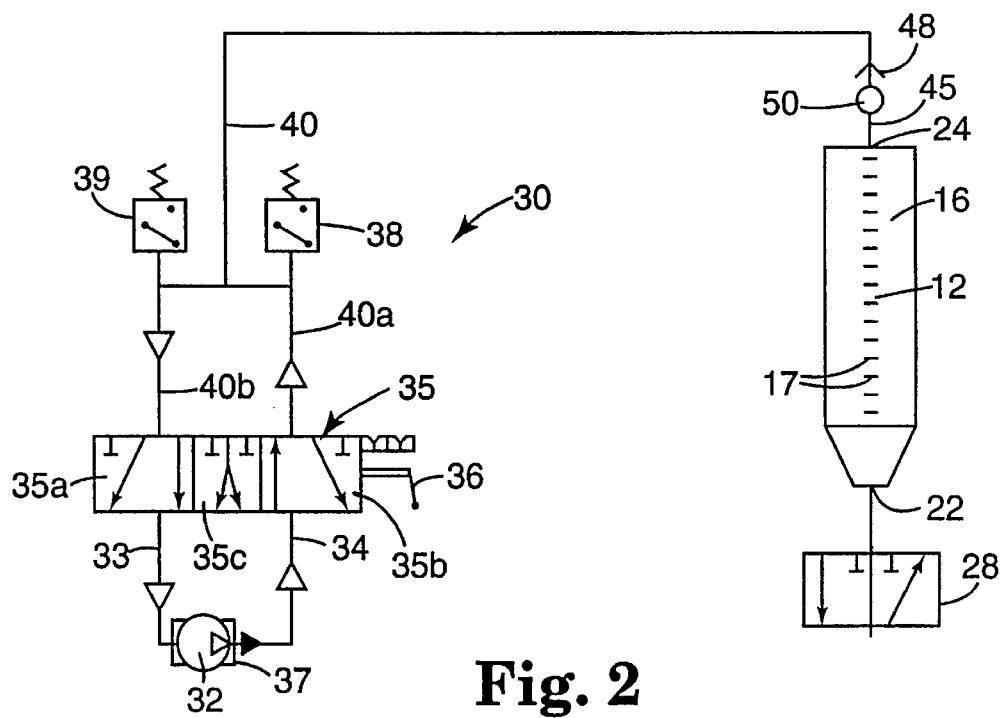
FIG. 2 is a schematic of the measuring system illustrated in FIG. 1.

The air pressure control means 30, shown schematically in FIG. 2, comprises air pump means including an air pump 32 for causing a vacuum in an air inlet line 33 through which air is drawn into the air pump 32, and for causing air pressure above atmospheric pressure in an air outlet line 34 through which air is expelled from the pump 32; and air valve means 35 manually operable by a single handle 36 for alternately, by manipulation of the handle, 1) connecting the air inlet line 33 to the air passage opening 24 of the tank 12 to cause a partial vacuum in the tank 12 to afford drawing liquid into the tank 12 through the liquid passage opening 22 when it is open, 2) connecting the air outlet line 34 to the air passage opening 24 of the tank 12 to cause a pressure above atmospheric pressure in the tank 12 to help cause movement of liquid out of the tank 12 through the liquid passage opening 22 when it is open, and 3) blocking the air passage opening 24 of the tank 12 from the air inlet line 33 and from the air outlet line 34.

The air pump 32 included in the air pump means is a diaphragm pump (e.g., the air pump model 907CDC18 by Thomas Industries, Inc. and available through John Henry Foster Minnesota, Inc., Egan, Minn.) connected between the inlet and outlet lines 33 and 34, and is operated by a 12 volt D.C. motor 37 operably coupled to the pump 32 so that the air pump 32 can be powered from the electrical system in a vehicle or truck by which the chemical measuring system 10 is moved from place to place.

The tank air pressure control means 30 includes means for limiting both the amount of pressure and the amount of vacuum that it can create in the tank 12. Pressure operated electrical switches including a high pressure control switch 38 and a high vacuum control switch 39 (e.g., appropriate ones of the F-4100 series miniature pressure switches available from Air Logic, Racine, Wis.) are attached to the air line network 40 between the air valve means 35 and the tank 12 and are connected in the electrical circuit that supplies power to the motor 37. Should the pressure in that air line network (which is the same as the pressure in the tank 12) rise above a predetermined high pressure(e.g., 10 psi) or fall below a predetermined vacuum (e.g., 8 inches of mercury), the appropriate switch 38 or 39 will interrupt power to the motor 37, thereby maintaining the pressure in the tank 12 between predetermined limits.

The air valve means 35 is a valve 35 of the type commercially designated "a 5/3 4 way position E spool detented valve. Port 1 open to ports 2 and 4 and ports 3 and 5 blocked in neutral" which is available from Automatic Valve, Novi, Minn. The spool in the valve 35 is movable to any one of three positions by manual operation of the handle 36, and once moved to a position the spool will remain there because of a détente in the valve until it is again moved by manual operation of the handle 36. In a position of the spool schematically depicted by the left hand block 35a representing the valve 35 in FIG. 2, when the air pump 32 is operating air is drawn into the air inlet line 33 of the pump through an open port of the valve 35 and compressed air in the air outlet line 34 is connected to leg 40a of the air line system 40 through the valve 35 (leg 40b of the air line system 40 being blocked at the valve 35) so that compressed air is supplied to the tank 12. In a position of the spool schematically depicted by the right hand block 35b representing the valve 35 in FIG. 2, when the air pump 32 is operating air is drawn into the air inlet line 33 of the air pump 32 through ports in the valve 35 from leg 40b of the air line system 40, (leg 40a of the air line system 40 being blocked at the valve 35) and compressed air in the air outlet line 34 is expelled to the atmosphere through and open port of the valve 35 so that a vacuum is created in the tank 12. In a position of the spool schematically depicted by the center block 35c representing the valve 35 in FIG. 2, when the air pump 32 is operating air is drawn into the air inlet line 33 of the air pump 32 and is expelled to the atmosphere through and open port of the valve 35, while legs 40a and 40b of the air line system 40 are blocked at the valve 35 so that the air pump 32 causes no change in the pressure or vacuum in the tank 12.

Figure 4:
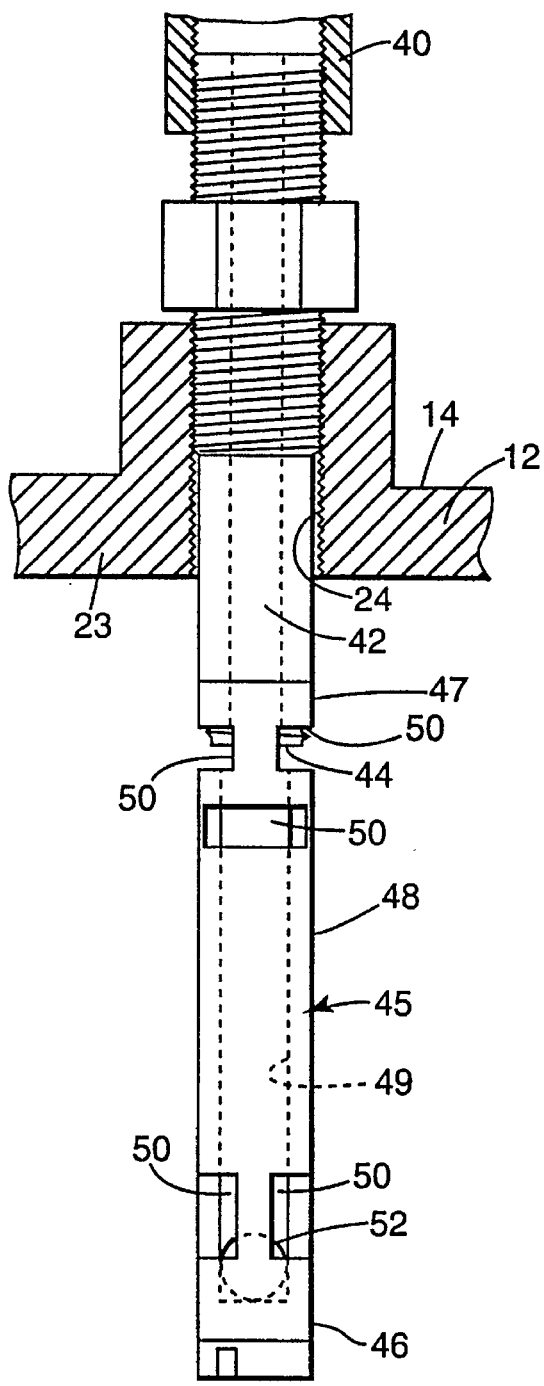
FIG. 4 is a fragmentary much enlarged vertical side view of a liquid restricting means included in the liquid chemical measuring system illustrated in FIG. 1.

Means are provided for restricting flow of liquid out of the tank 12 through the air passage opening 24 while affording the flow of air into and out of the tank 12 through the air passage opening 24, which is useful to restrict contaminating the tank pressure control means 30 with liquid chemical should a user allow the liquid to totally fill the tank 12. That means for restricting (see FIG. 4) comprises a tubular air line 42 with a central air passageway coupled to the air passage opening 24 in the tank 12, projecting into the tank 12, and having an annular distal end 44 around the passageway; and a conduit 45 having lower and upper ends 46 and 47, an outer surface 48, an inner surface 49 defining a through opening having an axis parallel with the axis 13 of the tank 12 between its lower and upper ends 46 and 47, and through apertures 50 between its inner and outer surfaces 49 and 48 spaced axially along the conduit 45. The upper end of the conduit is attached by threads around the end of the tubular air line 42 with the annular distal end 44 in the through opening and in two of the apertures 50. A spherical member 52 of polymeric material is positioned and freely axially moveable within the through opening. The spherical member 52 has a specific density less than the specific densities of liquid chemicals the chemical measuring system 10 is adapted to measure. The spherical surface of the member 52 will seat against the annular distal end 44 of the tubular air line 42. At least one of the apertures 50 (i.e., the aperture adjacent the annular distal end 44) and the through opening in the conduit 45 afford flow of air into and out of the tubular air line 42 when the spherical member 52 is spaced from the distal end 44 so that air can flow in both directions through that aperture 50 and through opening past the spherical member 52, while liquid moving into the conduit 45 through the apertures 50 will lift and press the spherical member 52 into engagement with the annular distal end 44 and restrict flow of liquid out of said tank 12 through the air passage opening 24. Such seating of the spherical member 52 against the annular distal end 44 will cause vacuum to increase in the air line system 40 until it reaches the maximum vacuum allowed by the low pressure switch 39, whereupon that switch 39 will interrupt power to the motor 37 for the air pump 32.

The tank 12 is made with unitary walls of polymeric material (i.e., polyethylene) by spin molding techniques. The tank 12 can be made in different sizes, such as (1) a 7.5 gallon size having a 0.2 inch thick wall, a 7 inch diameter for its cylindrical portion 16, and an overall axial length of 56 inches; (2) a 15 gallon size having a 0.2 inch thick wall, a 10 inch diameter for its cylindrical portion 16, and an overall axial length of 56 inches; and (3) a 30 gallon size having a 0.25 inch thick wall, a 14.5inch diameter for its cylindrical portion 16, and an overall axial length of 56 inches. The graduations 17 and indications of the amount of liquid the tank 12 contains when the liquid level reaches the graduations 17 can be molded onto the outer surface of the tank 12. Alternatively, or as a supplement to such molded graduations 17 a strip of material with graduations and such indications may be adhered to the outer surface of the tank 12. In addition to the air passage opening 24, the transverse wall 23 also has an auxiliary opening 58 of the same size that is normally plugged with a pipe plug, but which can be opened to afford inserting a hose or funnel through which liquid chemicals can be fed into the tank 12, and/or through which a water can be sprayed to clean the interior of the tank 12.

The means 26 for supporting the tank 12 with its axis 13 vertical and its upper end 14 uppermost is a metal frame and includes an annular portion 61 adapted to be supported on a horizontal surface and having a radius significantly bigger than the radius of the cylindrical upper portion 16 of the tank 12, a first or support collar 62 around the funnel shaped lower portion 20 having an inner radius smaller than the radius of the upper portion 16 and adapted to support the weight of the tank 12, four first or weight support members 64 between the support collar 62 and the annular portion 61 coaxially positioning the tank 12 and annular portion 61 with the liquid valve means 28 spaced above the horizontal surface on which the annular portion 61 is supported; a second or stabilizing collar 66 around the upper portion 16, and four second support or stabilizing members 68 between the stabilizing collar 66 and the annular portion 61. To provide a desired stability for the tank 12, the ratio between the dimension between the annular portion 61 and the upper end 14 of the tank 12 measured axially of the tank 12 and the diameter dimension of the annular portion 61 should be less than 3 to 1, with such a ration of 2 to 1 being preferred. A reinforcing ring 69 can also be used around the upper portion of the tank 12 to restrict deformation of the tank 12 due to pressure or vacuum.

Where more than one tank 12 is to be used in the liquid chemical measuring system, means for supporting the tanks 12 with their axes 13 vertical and their liquid valve means 28 spaced above a surface on which they are supported can be provided by a frame or rack (not shown) adapted to receive the tanks 12 side by side.

To operate the liquid chemical measuring system 10, a user connects one port of the three way ball valve 28 to a source of the liquid chemical to be measured, (e.g., to a tank at a commercial source of the liquid chemical or to a mini-bulk tank) and connects the motor 37 to a source of 12 volt D.C. power (e.g., to the battery of a vehicle). The user then activates the motor 37 by operating a switch (not shown) in the motor power supply, positions the ball valve 28 so that it connects the source of the liquid chemical to the tank 12, and moves the lever 36 to position the spool in the air valve 35 so that the air pump 32 causes a vacuum in the tank 12. That vacuum will cause liquid to move into the tank 12 from the source of liquid (e.g., at 4 gallons per minute). The user visually observes the level of the liquid as it rises into the upper portion 16 of the tank 12, and stops the flow of liquid into the tank by use of the lever 36 when that level is aligned with a graduation 17 on the tank that represents the desired amount of liquid chemical. If the user allows the liquid to rise above the appropriate graduation 17, he may allow the level to lower by gravity flow out of the tank and/or by moving the lever 36 to cause a pressure in the tank 12. After the proper amount of liquid chemical is in the tank 12, the user manually moves the ball valve to close the liquid passage 22 out of the tank, and may then, or at a later time, discharge that liquid chemical through a different or the same outlet on the ball valve 28 by moving the ball valve to connect that outlet to the tank. The liquid chemical may be discharged by gravity and/or moving the handle 36 to the position where the air pump 32 will apply air pressure in the tank 12 to help discharge the liquid chemical.

The present invention has now been described with reference to several embodiments thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

We claim:

1. A chemical measuring system comprising:

a tank having unitary walls of a polymeric material made by spin molding techniques, said tank having a central axis, upper and lower axially spaced ends, an upper portion adjacent said upper end having graduations indicating the amount or liquid required to fill the tank to each of said graduations when said tank is disposed with said axis vertical and said upper end uppermost, said walls being sufficiently light transmissive to afford visual observation of the level of the liquid in the upper portion of the tank, said tank having a generally funnel shaped portion adjacent said lower end decreasing in area from said upper portion to said lower end, liquid passage opening at said lower end, a transverse wall at said upper end, and an air passage opening adjacent said upper end;

means for supporting said tank with said axis vertical and said upper end uppermost liquid valve means attached to said tank across said liquid passage opening adapted for opening or closing said liquid passage opening; and tank air pressure control means coupled to the air passage opening of said tank, said air pressure control means comprising air pump means having an air inlet line and an air outlet line for causing a vacuum in said air inlet line to drew air into said pump means and causing air pressure above atmospheric pressure in said air outlet line, and air valve means manually operable by a single handle for alternately 1) connecting said air inlet line to the air passage opening of said tank to cause a partial vacuum in said tank to afford drawing liquid into said tank through said liquid valve means, 2) connecting said air outlet line to the air passage opening of said tank to cause a pressure above atmospheric pressure in said tank to bias liquid to afford movement of liquid out of said tank through said liquid valve means, and 3) blocking the air passage opening or said tank from said air inlet and from said air outlet line.

2. A chemical measuring system according to claim 1 wherein said upper portion is cylindrical.

3. A chemical measuring system according to claim 1 wherein said tank air pressure control means includes means for limiting the amount of said pressure and the amount of said vacuum that can be created in said tank by said tank air-pressure control means.

4. A chemical measuring system according to claim 1 wherein said air pump means comprises a diaphragm pump connected between said inlet and outlet lines, and a motor coupled to said pump to operate said pump, said motor being operable by 12 volt direct current power.

5. A chemical measuring system according to claim 1 further including means for restricting flow of liquid out of said tank through said air passage opening while affording the flow of air into and out of said tank through said air passage opening.

6. A chemical measuring system according to claim 1 wherein said unitary walls are of polyethylene.

7. A chemical measuring system according to claim 1 wherein said air valve means comprises a spool valve.

8. A chemical measuring system comprising:

wall means defining an elongate tank having a central axis upper and lower axially spaced ends a cylindrical upper portion adjacent said upper end having a predetermined radius around said axis and having graduations indicating the amount of liquid required to fill the tank to each of said graduations when said tank is disposed with said axis vertical and said upper end uppermost said wall means being of polymeric material and being sufficiently light transmissive to afford visual observation of the level of the liquid in the upper portion of the tank, said tank having a generally funnel shaped portion adjacent said lower end decreasing in area from said upper portion to said lower end, a liquid passage opening at said lower end, a transverse wall at said upper end, and an air passage opening adjacent said upper end;

means for supporting said tank with said axis vertical and said upper end uppermost liquid valve means attached to said tank across said liquid passage opening adapted for opening or closing said liquid passage opening; and tank air pressure control means coupled to the air passage opening of said tank, said air pressure control means comprising air pump means having an air inlet line and an air outlet line for causing a vacuum in said air inlet line to draw air into said pump means and causing air pressure above atmospheric pressure in said air outlet line, and air valve means manually operable by a single handle for alternately 1) connecting said air inlet to the air passage opening of said tank to cause a partial vacuum in said tank to afford drawing liquid into said tank through said liquid valve means 2) connecting said air outlet line to the air passage opening of said tank to cause a pressure above atmospheric pressure in said tank to bias liquid to afford movement of liquid out of said tank through said liquid valve means and 3) blocking the air passage opening of said tank from said air inlet and from said air outlet line;

said means for supporting said tank with said axis vertical and said upper end uppermost comprising an annular portion adapted to be supported on a horizontal surface and having a radius bigger than said predetermined radius of said upper portion, a first collar around said funnel shaped portion having an inner radius smaller than the predetermined radius of said upper portion and adapted to support the weight of said tank, first support members between said first collar and said annular portion coaxially positioning said tank and annular portion with said liquid valve means spaced above the horizontal surface on which said annular portion is supported; a second collar around said upper portion, and second support members between said second collar and said annular portion.

9. A chemical measuring system according to claim 8 wherein the ratio between the dimension between said annular portion and the upper end of said tank measured axially of said tank and the diameter dimension of said annular portion is less than 3 to 1.

10. A chemical measuring system according to claim 8 wherein the ratio between the dimension between said annular portion and the upper end of said tank measured axially of said tank and the diameter dimension of said annular portion is 2 to 1.

11. A chemical measuring system wherein comprising:

wall means defining a tank having a central axis, upper and lower axially spaced ends, a liquid passage opening at said lower end, and an air passage opening adjacent said upper end;

means for supporting said tank with said axis vertical and said upper end uppermost liquid valve means attached to said tank across said liquid passage opening adapted for opening or closing said liquid passage opening:

tank air pressure control means coupled to the air passage opening of said tank, said air pressure control means comprising air pump means having an air inlet line and an air outlet line for causing a vacuum in said air inlet line to draw air into said pump means and causing air pressure above atmospheric pressure in said air outlet line, and air valve means manually operable by a single handle for alternately 1) connecting said air inlet line to the air passage opening of said tank to cause a partial vacuum in said tank to afford drawing liquid into said tank through said liquid valve means, 2) connecting said air outlet line to the air passage opening of said tank to cause a pressure above atmospheric pressure in said tank to bias liquid to afford movement of liquid out of said tank through said liquid valve means, and 3) blocking the air passage opening of said tank from said air inlet and from said air outlet line; and means for restricting flow of liquid out of said tank through said air passage opening while affording the flow of air into and out of said tank through said air passage opening comprising:

a tubular air line with a central air passageway coupled to air passage opening, projecting into said tank, and having an annular distal end around said passageway, a conduit having lower and upper ends, an outer surface, an inner surface defining a through opening having an axis parallel with the axis of said tank between said lower and upper ends, and through apertures between said inner and outer surfaces spaced axially along said conduit, said upper end being attached around said tubular air line with said annular distal end in said through opening, and a spherical member positioned and freely axially movable in said through opening, said spherical member having a specific density less than the specific densities of liquid chemicals the chemical measuring system is adapted to measure, and having a peripheral surface adapted to seat against said annular distal end of said tubular air line, at least one of said apertures and said through opening in said conduit affording flow of air into and out of the central opening in said tubular air line when said spherical member is spaced from said annular distal end so that air can flow in both directions through said aperture and through opening past said spherical member, while liquid moving into said through opening in said conduit through said apertures will lift and press said spherical member into engagement with said annular distal end and restrict flow of liquid out of said tank through said air passage opening.

* * * * *